United States Patent Office 3,303,203
Patented Feb. 7, 1967

3,303,203
PURIFICATION OF CRUDE PHTHALIC ANHYDRIDE
Siegfried Meinstein, Oak Lawn, Ill., assignor to Witco Chemical Company, Inc., New York, N.Y., a corporation of Delaware
No Drawing. Filed July 6, 1965, Ser. No. 469,856
8 Claims. (Cl. 260—346.7)

My invention relates to the purification of crude phthalic anhydride derived from the vapor phase oxidation of ortho-xylene.

Numerous methods have been suggested, and various of them have been commercially employed, for purifying crude phthalic anhydride. These prior methods include, by way of illustration, refluxing the crude phthalic anhydride with small amounts of ammonium acid sulfate or with lithium nitrate or with sodium bisulfite at elevated temperatures. Another of such known procedures involves a two step operation in which, in the first step, the crude phthalic anhydride, whether produced by oxidation of naphthalene or ortho-xylene, is treated with an oxidizing agent, such as sulfuric acid or hydrogen peroxide, at temperatures above 270° C. Such procedures, while reasonably effective, generally speaking, possess one or more of a number of disadvantages, or combinations of disadvantages, in relation to the over-all quality of the refined or purified phthalic anhydride obtained, amounts of tarry formation products, and yields of the refined or purified phthalic anhydride.

My invention, particularly when carried out under optimum conditions, results in significant improvements with respect to overcoming one or more of the foregoing deficiencies of heretofore known procedures for purification of crude phthalic anhydride derived from the vapor phase oxidation of ortho-xylene. Illustrative crude phthalic anhydrides prepared by the vapor phase oxidation of ortho-xylene in the presence of typical oxidation catalysts have the following analyses:

|  | Sample A, wt. percent | Sample B, wt. percent |
|---|---|---|
| Phthalic anhydride | 97.2 | 95.3 |
| Maleic anhydride | 0.96 | 1.12 |
| Citraconic acid | 0.23 | 0.26 |
| Benzoic acid | 0.05 | 0.10 |
| Toluic acid |  | 0.04 |
| Phthalide | 0.34 | 2.74 |
| O-tolualdehyde | Trace | 0.26 |
| Benzaldehyde | 0.03 | 0.01 |
| Unidentified non-acid materials |  | 0.18 |

Such crude phthalic anhydrides have been found to be much more refractory to purification procedures than crude phthalic anhydrides produced by the vapor phase oxidation of naphthalene. This is presumably due to the presence in the ortho-xylene derived crude phthalic anhydride of certain types of impurities, and/or proportions thereof, which are not present in crude phthalic anhydrides derived from naphthalene sources. The present invention, therefore, has its most significant value in the purification of crude phthalic anhydride prepared from ortho-xylene. It is also of marked advantage in the purification of crude phthalic anhydrides prepared by the vapor phase oxidation of mixtures of ortho-xylene and naphthalene, particularly where the ortho-xylene content of said mixtures is of the order of at least 25%, by weight, and, better still, of the order of 50% or more of ortho-xylene. In this same general connection, it may also be noted that the present invention permits excellent purification of crude phthalic anhydride produced from ortho-xylene under relatively mild oxidation conditions. Heretofore, with respect to various purification procedures, the removal of objectionable impurities from crude phthalic anhydride produced from ortho-xylene under relatively mild oxidation conditions has been difficult. Hence, higher oxidation temperatures were used to facilitate subsequent removal of impurities. Such higher oxidation temperatures are hazardous causing not infrequent fires in the oxidation reactor. Utilizing my present invention, it is possible, in the oxidation reactor, to use relatively lower temperatures in the production of the crude phthalic anhydride from ortho-xylene, and still obtain effective purification of the phthalic anhydride.

Briefly stated, my method of refining or purifying crude phthalic anhydride derived from the vapor phase oxidation of ortho-xylene comprises providing a mixture of the crude phthalic anhydride, in molten form, with small proportions of an alkali metal or alkaline earth metal or zinc hydrosulfite or hyposulfite ($Me_wS_2O_4$) where Me is an alkali metal such as sodium, potassium, lithium, ammonium, calcium, barium, magnesium, and zinc, and $w$ is 2 when Me is an alkali metal and $w$ is 1 when Me is an alkaline earth metal or zinc, and heating said mixture for several hours at elevated temperatures. While the temperature may range from about 200 to 300° C., as a practical proposition it will fall within the range of 230 to 290° C. and will generally be above 270° C. but not substantially in excess of the boiling point of phthalic anhydride at atmospheric pressure. The refined or purified phthalic anhydride is recovered by distillation from the mixture under a pressure below atmospheric pressure or, in other words, by fractional distillation under conditions of vacuum or subatmospheric pressure, advantageously at a temperature of about 215 to 220° C. In certain instances, it has been found to be particularly advantageous to utilize the aforesaid hydrosulfites in conjunction with small proportions of at least one member selected from the group consisting of alkali metal and alkaline earth metal hydroxides, carbonates, and bicarbonates.

I have also found that, in place of the aforesaid hydrosulfites, alkali metal and alkaline earth metal and zinc formaldehyde sulfoxylates can be employed.

The hydrates of the foregoing hydrosulfites and formaldehyde sulfoxylates can be used by it is preferred to utilize said compounds in their anhydrous or non-hydrate forms.

Of the aforesaid hydrosulfites and formaldehyde sulfoxylates, the sodium salts are especially satisfactory. The proportions of the aforesaid hydrosulfites and formaldehyde sulfoxylates employed are, in all cases, quite small being, at least in part, dependent upon the selection of the particular hydrosulfite or formaldehyde sulfoxylate and the content and nature of the impurities present in the crude phthalic anhydride to be treated. In general, the proportions of the said hydrosulfites and/or formaldehyde sulfoxylates need not exceed 1%, based on the weight of the crude phthalic anhydride, and will usually fall into the range of 0.05% to 1%, with a particularly preferred range of 0.1% to 0.4%. In the case of sodium hydrosulfite, for instance, the optimum proportions, in the usual case, will be found to be in the range of 0.2% to 0.4%. It will be understood, of course, that mixtures of the aforesaid hydrosulfites and formaldehyde sulfoxylates can be utilized.

I have also found it to be particularly advantageous to utilize the aforementioned hydrosulfites and/or formaldehyde sulfoxylates in conjunction with alkali metal or alkaline earth metal hydroxides or carbonates or bicarbonates, illustrative examples of which are sodium hydroxide, potassium hydroxide, lithium hydroxide, sodium carbonate, potassium carbonate, lithium carbonate, sodium bicarbonate, calcium hydroxide, calcium carbonate, magnesium hydroxide, magnesium carbonate, and mixtures of two or more thereof. Potassium carbonate is especially satisfactory and its use, in conjunction with sodium hydrosulfite, represents the most important embodiment of the invention. The proportions of the alkali metal and alkaline earth metal hydroxides, carbonates and bicarbonates so utilized will also, in all cases, be quite small, and will, generally speaking, be very considerably less than the proportions of the hydrosulfites and/or formaldehyde sulfoxylates. In the usual case, the proportions thereof will fall within the range of about 0.01% to about 1% by weight of the crude phthalic anhydride. In the case of potassium carbonate, the optimum proportions will usually be found to lie within the range of 0.03% to 0.1% with a good average being substantially 0.05%, particularly where the potassium carbonate is used in conjunction with sodium hydrosulfite.

The temperature of treatment, as stated previously, is, generally speaking, advantageously above 270° C. and particularly at about the boiling point of phthalic anhydride at atmospheric pressure which is approximately 285° C. The treatment time, as stated, is several hours, with an optimum time, in the usual case, where the temperature utilized is about 285° C., of about 5 to 12 hours. Generally speaking, for best results the treatment time should be more than 5 hours and ordinarily should not exceed 12 hours. A range of about 7 to 11 hours will usually be found to be very satisfactory. The treatment will, in general, be conducted under reflux.

The advantages of the invention may be somewhat further indicated by reference to the following table which illustrates the nature of the purification obtainable by the practice of my present invention when measured against the nature of the purification obtained by a typical heretofore known procedure.

TABLE

|  | Application Procedure | Typical Prior Art Procedure |
| --- | --- | --- |
| Color APHA | 5 | 10 |
| Heat Stability APHA | 10 | 40 |
| Total acidity as PA, percent | 99.95 | 99.75 |
| Solidification point, °C | 131.15 | 130.8 |
| 1,4 naphthoquinone, p.p.m | (¹) | 2 |
| Phthalide, percent | 0.05 | 0.3 |
| Maleic anhydride, percent | 0.05 | 0.15 |
| Other impurities, percent | (¹) | 0.5–1.0 |

¹ None detectable.

The following examples are illustrative and are not to be construed as in any way limitative of the scope of the invention. All parts given are by weight.

*Example 1*

To 100,000 parts of ortho-xylene derived molten crude phthalic anhydride at a temperature of approximately 200° C., 300 parts of anhydrous $Na_2S_2O_4$ and 50 parts of $K_2CO_3$ are added, and the resulting mixture is admixed, by stirring or by circulation, and heated to 285° C. and held at said temperature for 10 hours. It is then fractionally distilled under vacuum, forecut being collected at 90 mm.–100 mm. Hg with a 15/1 reflux ratio and heart-cut at 75 mm.–80 mm. Hg with a 3/1 reflux ratio, the still temperature being maintained at 215° C. to 220° C.

A fore-run of 3% to 5% of the total, which boils slightly below the boiling point of phthalic anhydride, is separated. This material contains essentially all of the remaining undesirable low-boiling impurities.

The heart-cut or main distillate constitutes 87% to 94% of the crude and is of the highest purity. A low amount of undesirable residue as well as low fore-run is obtained. The fore-run, contrary to the situation with respect to various other purification procedures where said fore-run must be discarded, can be reworked with succeeding treatments of crude phthalic anhydride pursuant to my present invention whereby to increase the total yield of purified phthalic anhydride.

*Example 2*

To 1000 parts of molten crude phthalic anhydride, derived from the oxidation of a 50–50 mixture of naphthalene and ortho-xylene, there are added 4 parts of sodium formaldehyde sulfoxylate and 0.4 part of potassium carbonate, and the procedure otherwise described in Example 1 is followed.

The practice of the method of the present invention enables the production of high over-all quality of refined or purified phthalic anhydride particularly from ortho-xylene derived sources, with reduced formation of tars and with excellent refinery yields. Distillations run smoothly and reflux ratios can be lowered in many cases, for instance, to 3/1 or 1/1, or, in some cases, even to 1/2 without adverse effect on the quality of the purified phthalic anhydride obtained. In addition to the quality values, 24-hour ultraviolet (Weather-O-Meter) tests have shown superior ratings (zero—no color change) for purified phthalic anhydrides produced pursuant to the present invention. Additional advantageous features which have been noted are the essential absence of destruction of phthalic anhydride in the treating process, and low viscosities of the residues.

What I claim as new and desire to protect by Letters Patent of the United States is:

1. A method of purifying crude phthalic anhydride derived from the vapor phase oxidation of ortho-xylene and mixtures of ortho-xylene and naphthalene in which the ortho-xylene constitutes at least 25% by weight of the mixtures, which comprises providing a mixture thereof with a small proportion of at least one member selected from the group consisting of alkali metal hydrosulfites, alkaline earth metal hydrosulfites, and zinc hydrosulfite, heating said mixture at an elevated temperature for several hours, and then recovering purified phthalic anhydride by distillation.

2. A method of purifying crude phthalic anhydride derived from the vapor phase oxidation of ortho-xylene and mixtures of ortho-xylene and naphthalene in which the ortho-xylene constitutes at least 25% by weight of the mixtures, which comprises providing a mixture thereof with from about 0.1% to 0.4% sodium hydrosulfite, by weight of said anhydride, heating said mixture at a temperature of about 285° C. under reflux for from about 7 to 11 hours, and then recovering purified phthalic anhydride by distillation under a pressure below atmospheric pressure.

3. A method of purifying crude phthalic anhydride derived from the vapor phase oxidation of ortho-xylene and mixtures of ortho-xylene and naphthalene in which the ortho-xylene constitutes at least 25% by weight of the mixtures, which comprises providing a mixture thereof with a small proportion of at least one member selected from the group consisting of alkali metal formaldehyde sulfoxylate, alkaline earth metal formaldehyde sulfoxylate, and zinc formaldehyde sulfoxylate, heating said mixture at an elevated temperature for several hours, and then recovering purified phthalic anhydride by distillation.

4. A method of purifying crude phthalic anhydride derived from the vapor phase oxidation of ortho-xylene and mixtures of ortho-xylene and naphthalene in which the ortho-xylene constitutes at least 25% by weight of the mixtures, which comprises providing a mixture of said crude anhydride with small proportions of (1) at least one member selected from the group consisting of alkali metal hydrosulfites, alkaline earth metal hydrosulfites, and zinc hydrosulfite, and small proportions of (2) at least one member selected from the group consisting of alkali metal and alkaline earth metal hydroxides, carbonates and bicarbonates, heating said mixture at an elevated temperature under reflux for several hours, and then recovering purified phthalic anhydride by distillation under a pressure below atmospheric pressure.

5. A method of purifying crude phthalic anhydride derived from the vapor phase oxidation of ortho-xylene and mixtures of ortho-xylene and naphthalene in which the ortho-xylene constitutes at least 25% by weight of the mixtures, which comprises providing a mixture of said crude anhydride with small proportions of (1) at least one member selected from the group consisting of alkali metal formaldehyde sulfoxylates, alkaline earth metal formaldehyde sulfoxylates, and zinc formaldehyde sulfoxylate, and small proportions of (2) at least one member selected from the group consisting of alkali metal and alkaline earth metal hydroxides, carbonates and bicarbonates, heating said mixture at an elevated temperature under reflux for several hours, and then recovering purified phthalic anhydride by distillation under a pressure below atmospheric pressure.

6. A method of purifying crude phthalic anhydride derived from the vapor phase oxidation of ortho-xylene and mixtures of ortho-xylene and naphthalene in which the ortho-xylene constitutes at least 25% by weight of the mixtures, which comprises providing said crude phthalic anhydride in molten form to which there is added in proportions, by weight of said crude anhydride, 0.1% to 0.4% of sodium hydrosulfite and 0.03% to 0.1% of potassium carbonate, heating said mixture at a temperature of from 230 to 290° C. for a period of about 7 to about 11 hours under reflux, and then recovering purified phthalic anhydride by distillation under a pressure below atmospheric pressure.

7. A method of purifying crude phthalic anhydride derived from the vapor phase oxidation of ortho-xylene and mixtures of ortho-xylene and naphthalene in which the ortho-xylene constitutes at least 25% by weight of the mixtures, which comprises providing said crude phthalic anhydride in molten form to which there is added, in proportions, by weight of said crude anhydride, 0.1% to 0.4% of sodium formaldehyde sulfoxylate and 0.03% to 0.1% of potassium carbonate, heating said mixture at a temperature of 230–290° C. for a period of about 7 to about 11 hours under reflux, and then recovering purified phthalic anhydride by distillation under a pressure below atmospheric pressure.

8. A method of purifying crude phthalic anhydride derived from the vapor phase oxidation of ortho-xylene and mixtures of ortho-xylene and naphthalene in which the ortho-xylene constitutes at least 25% by weight of the mixtures, which comprises providing said crude phthalic anhydride in molten form to which there is added in proportions, by weight of said crude anhydride, 0.1% to 0.4% of sodium hydrosulfite and 0.03% to 0.1% potassium carbonate, heating said mixture at about 285° C. for a period of about 7 to about 11 hours under reflux, and then recovering purified phthalic anhydride by distillation under a pressure below atmospheric pressure and at a temperature within the range of about 215 to 220° C.

References Cited by the Examiner
UNITED STATES PATENTS 2,662,901   12/1953   Bailey _____ 260—346.7

NICHOLAS S. RIZZO, *Primary Examiner.*